(12) United States Patent  (10) Patent No.: US 8,462,424 B2
Lamour et al.  (45) Date of Patent: Jun. 11, 2013

(54) OPTICAL APPARATUS

(75) Inventors: Tobias Paul Lamour, Ostrach-Waldeuren (DE); Derryck Telford Reid, West Lothian (GB); Lukasz Kornaszewski, Barcelona (ES)

(73) Assignee: Heriot-Watt University, Edinburgh (GB)

( * ) Notice: Subject to any disclaimer, the term of this patent is extended or adjusted under 35 U.S.C. 154(b) by 229 days.

(21) Appl. No.: 12/790,000

(22) Filed: May 28, 2010

(65) Prior Publication Data
US 2010/0328761 A1   Dec. 30, 2010

Related U.S. Application Data

(60) Provisional application No. 61/226,414, filed on Jul. 17, 2009.

(30) Foreign Application Priority Data

May 29, 2009   (GB) .................................... 090295.8

(51) Int. Cl.
G02F 1/39 (2006.01)
(52) U.S. Cl.
USPC ........................................................ 359/330
(58) Field of Classification Search
USPC ................................ 359/326–332; 372/21–22
See application file for complete search history.

(56) References Cited

U.S. PATENT DOCUMENTS

| | | | |
|---|---|---|---|
| 4,991,182 A | 2/1991 | Logan et al. | |
| 5,786,929 A | 7/1998 | Nabors | |
| 6,700,698 B1 | 3/2004 | Scott | |
| 7,697,196 B2* | 4/2010 | Harvey | 359/330 |
| 2008/0037595 A1* | 2/2008 | Gankkhanov et al. | 372/3 |
| 2011/0058248 A1* | 3/2011 | Vodopyanov et al. | 359/330 |

OTHER PUBLICATIONS

Bauer et al., "Potentials and limits of mid-infrared laser spectroscopy for the detection of explosives," Appl. Phys., 2008, vol. B 92, p. 327-333.

Butterworth et al., "A simple technique to achieve active cavity-length stabilisation in a synchronously pumped optical parametric oscillator," Opt. Commun., 1996, vol. 123, pp. 577-582.

Cho et al., "Generation of 90-nJ pulses with a 4-MHz repetition-rate Kerr-lens mode-locked Ti:Al2O3 laser operating with net positive and negative intracavity dispersion," Opt. Lett., 2001, vol. 26, pp. 560-562.

Cho et al., "Low-repetition-rate high-peak-power Kerr-lens mode-locked TiAl2O3 laser with a multiple-pass cavity," Opt. Lett., 1999, vol. 24, pp. 417-419.

(Continued)

*Primary Examiner* — Daniel Petkovsek
(74) *Attorney, Agent, or Firm* — Sheridan Ross P.C.

(57) ABSTRACT

An optical parametric oscillator (OPO) comprises a resonant cavity for signal light, and an optically non-linear medium disposed in the resonant cavity for converting pump light into the signal light, wherein the resonant cavity is arranged so that in operation signal light is repeatedly output from and returned to the optically non-linear medium along a signal light path in a continuously repeating cycle, and the OPO comprises delay means for extending the time taken for signal light output from the optically non-linear medium in operation to return to the optically non-linear medium along the signal light path.

25 Claims, 11 Drawing Sheets

OTHER PUBLICATIONS

Eaton et al., "Transition from thermal diffusion to heat accumulation in high repetition rate femtosecond laser writing of buried optical waveguides," Opt. Express, 2008, vol. 16, pp. 9443-9458.

Edelstein et al., "Broadly tunable high repetition rate femtosecond optical parametric oscillator," Appl. Phys. Lett., 1989, vol. 54, pp. 1728-1730.

Killi et al., "Diode-pumped femtosecond laser oscillator with cavity dumping," Opt. Lett., 2004, vol. 29, pp. 1288-1290.

Min et al., "Near-infrared cavity-dumped femtosecond optical parametric oscillator," Opt. Lett., 2005, vol. 30, pp. 1855-1857.

Myers et al., "Quasi-phase-matched optical parametric oscillators in bulk periodically poled LiNbO3," J. Opt. Soc. Am., 1995, vol. B 12, pp. 2102-2116.

O'Connor et al., "Synchronously pumped optical parametric oscillator driven by a femtosecond mode-locked fiber laser," Opt. Lett., 2002, vol. 27, pp. 1052-1054.

Papadopoulos et al., "Passively mode-locked diode-pumped Nd:YVO4 oscillator operating at an ultralow repetition rate," Opt. Lett., 2003, vol. 28, pp. 1838-1840.

Reid et al., "Broadly tunable infrared femtosecond optical parametric oscillator based on periodically poled RbTiOAsO4," Opt. Lett., 1997, vol. 22, pp. 1397-1399.

Reid et al., "Commercial semiconductor devices for two photon absorption autocorrelation of ultrashort light pulses," Appl. Opt., 1998, vol. 37, pp. 8142-8144.

Schaffer et al., "Micromachining bulk glass by use of femtosecond laser pulses with nanojoule energy," Opt. Lett., 2001, vol. 26, pp. 93-95.

Shcheslavskiy et al., "High-energy self-starting femtosecond Cr4+:Mg2SiO4 oscillator operating at a low repetition rate," Opt. Lett., 2001, vol. 26, pp. 1999-2001.

Südmeyer et al., "High-power femtosecond fiber-feedback optical parametric oscillator based on periodically poled stoichiometric LiTaO3," Opt. Lett., 2004, vol. 29, pp. 1111-1113.

Yang et al., "Power and spectral characteristics of continuous-wave parametric oscillators: the doubly to singly resonant transition," J. Opt. Soc. Am., 1993, vol. B 10, pp. 1684-1695.

Derryck et al., "Ultrafast optical parametric oscillators for spectroscopy," Proc. SPIE, vol. 7193, Feb. 27, 2009, pp. 719325-1-719325-13.

Kolev et al., "Passive mode locking of a Nd:YV04 laser with an extra-long optical resonator," Optics Letters, vol. 28(14), Jul. 15, 2003, pp. 1275-1277.

Miao et al., "Highly stable and efficient KTP-based intracavity optical parametric oscillator with a diode-pumped passively Q-switched laser," Applied Physics B, Lasers and Optics, vol. 88(2), Jun. 16, 2007, pp. 193-196.

Potma et al., "30 fs, cavity-dumped optical parametric oscillator," Optics Letters, vol. 23(22), Nov. 15, 1998, pp. 1763-1765.

Sevruk, B., "Numerical modeling of an optical parametric oscillator in the cavity-dumping mode," Journal of Applied Spectroscopy, vol. 68(1), Jan. 2001, pp. 101-109.

Stothard et al., "An Intracavity Optical Parametric Oscillator With Very High Repetition Rate and Broad Tunability Based Upon Room Temperature Periodically Poled With Fanned Grating Design," IEEE Journal of Quantum Electronics, vol. 45(3), Mar. 1, 2009, pp. 256-263.

* cited by examiner

Power spectral densities of the intensity noise on the pump (black) and the OPO signal (green) outputs, measured with Si and InGaAs photodiodes respectively. The right axis shows the cumulative intensity noise for the pump (red) and the OPO signal (blue). The mean output levels from the pump and OPO were normalised to 1 V for the analysis.

OPTICAL APPARATUS

This application claims the benefit of United Kingdom patent application No. GB090295.8, filed May 29, 2009 and U.S. Provisional Patent Application No. 61/226,414, filed Jul. 17, 2009, the entire disclosures of which are incorporated by reference herein.

FIELD OF THE INVENTION

The present invention relates to an optical apparatus and method, and in particular to an optical parametric oscillator and a method for operation of such optical parametric oscillator.

BACKGROUND TO THE INVENTION

Tunable near- to mid-infrared (IR) ultrafast optical pulses have a variety of applications in scientific, metrology and engineering contexts, including time-resolved spectroscopy, frequency-resolved spectroscopy, nonlinear spectroscopy, laser waveguide inscription, nonlinear microscopy and laser machining.

Two sources of such pulses are known in the prior art: (a) low-energy synchronously-pumped optical parametric oscillators (OPOs), operating at energies of typically <5 nJ and repetition rates of typically 80 MHz; and (b) optical parametric amplifiers pumped by amplified Ti:sapphire lasers, delivering repetition-rates in the 1 kHz-200 kHz range and energies in the 0.1-100 µJ range. For many applications there is an energy range (for example, 10-100 nJ) and repetition-rate (for example several MHz to several 10s of MHz) range that is desirable but which is not readily accessible to either of the conventional approaches.

There have been attempts to extend the operational range of OPOs. For example, C. Min et al, "Near-infrared cavity-dumped femtosecond optical parametric oscillator," Opt. Lett. 30, 1855-1857 (2005) describes the production of 90 nJ signal pulses in the near-IR region, at 1200 nm, using a cavity-dumped high-repetition-rate (82 MHz) OPO. However, the repetition rate of the signal pulses was not within the above-mentioned region, being 1 MHz, and the average pulse power was relatively low, at 90 mW. The idler pulses produced by the OPO were of low energy, at around 1 nJ, and were produced at the repetition rate of 82 MHz.

T. Südmeyer et al, "High-power femtosecond fiber-feedback optical parametric oscillator based on periodically poled stoichiometric LiTaO3," Opt. Lett. 29, 1111-1113 (2004) describes a fiber-feedback OPO that was synchronously pumped by a 58 W thin-disc laser and that was described as achieving 339 nJ output pulses at 1450 nm, at a repetition frequency of 56 MHz. However, the system described in T. Südmeyer et al requires a high average power complex pump laser (a 56 W thin-disc layer), which requires a chilled-water cooling system and includes a sophisticated, free-space array of multiple-pass mirrors, uses fibre feedback cavity with low cavity finesse, is not continuously tunable and whose output does not provide a diffraction-limited output beam ($M^2$ is 1.6). The output wavelength of the system described in T. Südmeyer et al is principally determined by the phase-matching range of the non-linear crystal that is used in the system.

Methods and apparatus are required that can directly provide tunable, high-energy near- to mid-infrared pulses at multi-MHz repetition rates, without the complexity and expense of ultrafast amplifier systems, are desirable.

It is an aim of the present invention to provide an improved, or at least alternative, optical apparatus and method.

SUMMARY OF THE INVENTION

According to a first aspect of the present invention, there is provided an optical parametric oscillator (OPO) comprising:—a resonant cavity for signal light; and an optically non-linear medium disposed in the resonant cavity for converting pump light into the signal light, wherein the resonant cavity is arranged so that in operation signal light is repeatedly output from and returned to the optically non-linear medium along a signal light path in a continuously repeating cycle; and the comprises delay means for extending the time taken for signal light output from the optically non-linear medium in operation to return to the optically non-linear medium along the signal light path.

By extending the time taken for signal light to return to the optically non-linear medium along the signal light path, signal pulses can be synchronised with pump laser pulses at lower repetition rates. In turn, that means that each pump pulse, and consequently corresponding signal pulses, can be of higher power.

It has been found that by extending the signal length path, thus enabling use of lower repetition rate pump pulses and higher pump pulse powers, signal pulses at frequencies, repetition rates and powers that were unobtainable using known systems, or that previously required complex and expensive amplifier systems, can be obtained. For example, the OPO may be able to provide low pulse-repetition-rate (<<80 MHz) ultrafast signal pulses (durations ~1 ps or less) having a range of pulse energy (10-100 nJ) and repetition rates (1-25 MHz) that are not obtainable, or difficult to obtain, using known oscillators or known amplified ultrafast lasers.

The signal light may convert the pump light into signal light and idler light. One of the signal light and the idler light usually has a higher wavelength than the other of the signal light and the idler light. The term light as used herein encompasses electromagnetic radiation of any frequency, and is not limited to visible light.

The resonant cavity may comprise the delay means. The delay means may be disposed within the resonant cavity. The resonant cavity or a portion of the resonant cavity may comprise a standing wave cavity or a ring cavity.

The delay means may comprise means for extending the signal light path.

The OPO may comprise an end reflector at each end. The cavity may comprise a standing wave cavity. Alternatively the cavity may comprise a ring cavity.

The delay means may be positioned between the optically non-linear medium and one of the end reflectors. The OPO may comprise focusing means for focusing signal light from the delay means at the optically non-linear medium. The delay means may be positioned between said one of the end reflectors and the focusing means. The means for extending the path for signal light may be arranged to extend the path to be longer than the shortest distance, in the absence of the intra-cavity delay means, between the end reflectors, the optically non-linear medium and any other optical components of the resonant cavity. The other optical components may comprise focussing lenses or mirrors for focussing signal light on the optically non-linear medium. The delay means may comprise a plurality of further reflectors. The further reflectors may be arranged so that the signal light path through the intra-cavity delay means comprises a plurality of signal light path portions along which the signal light propagates in substantially opposite directions in operation. The plurality of portions may comprise a plurality of successive portions. The plurality of portions may comprise at least three portions. The further reflectors may be arranged so that the plurality of portions have a zig-zag arrangement.

The system may further comprise coupling means for coupling the signal light into the optically non-linear medium. The intracavity delay means may be disposed between one of the end reflectors and the coupling means, and the coupling means may be disposed between the intra-cavity delay means and the optically non-linear medium. The coupling means may comprise at least one lens or mirror.

The delay means may comprise a relay imaging system disposed in the resonant cavity.

It has been found that the user of a relay imaging system in the resonant cavity can provide for stable operation of the OPO even for long signal path lengths.

The delay means may comprise a multi-pass mirror system disposed in the resonant cavity. By providing for multiple passes of each mirror, the signal path length can be increased without significantly increasing the size of the OPO.

The delay means may comprise a Herriott cell disposed in the resonant cavity. A Herriot cell can provide a particularly compact arrangement.

The OPO may further comprise focusing means for focusing signal light from the delay means at the optically non-linear medium.

In operation the signal light may comprise a signal beam, the pump light may comprise a pump beam, and the focusing means and delay means may be arranged to co-operate in operation so that the width of the signal beam at the optically non-linear medium is less than or equal to a predetermined threshold, for example so that the width of the signal beam is substantially equal to the width of the pump beam.

The signal beam may comprise a substantially diffraction-limited beam.

In operation an intracavity mode may be formed in the optically non-linear medium and the focusing means and delay means may be arranged to co-operate to re-image the intracavity mode in the optically non-linear medium.

By re-imaging the cavity mode, intra-cavity losses may be reduced and conversion efficiency in the optically non-linear medium may be increased. The cavity may comprise a high-finesse cavity.

The focusing means and delay means may be arranged so that the size of the reimaged intracavity mode in the optically non-linear medium is substantially independent of a variation in the signal light path length. Thus, tuning of the OPO by varying the signal light path length may be provided without compromising the stability of operation of the OPO.

The signal light path length may be at least one of between 3 m and 300 m; between 6 m and 60 m; and between 15 m and 30 m.

The signal light path in some embodiments may be substantially equal to twice the length of the cavity. The length of the cavity may be at least one of between 1.5 m and 150 m; between 3 m and 30 m; and between 7.5 m and 15 m.

The OPO may be operable as a synchronous OPO, the signal light may comprise at least one signal pulse and the intra-cavity delay means may be arranged so that in operation each signal pulse returned to the optically non-linear medium substantially overlaps with a pump pulse in the optically non-linear medium.

The delay means may be arranged so that each successive signal pulse that is generated reinforces the previous, reflected signal pulse, and for example, the signal light comprises a single, composite signal pulse.

The delay means may be arranged so that the difference between the arrival time of a reflected signal pulse at the optically non-linear medium and the arrival time of a pump pulse is less than at least one of the duration of the pump pulse, half the duration of the pump pulse and one tenth the duration of the pump pulse.

The OPO may be arranged to operate so that the signal light is in the near- to mid-infra red range.

The delay means may be arranged so that in operation a signal pulse is returned to the optically non-linear medium at a repetition frequency of at least one of between 1 MHz and 100 MHz; between 5 MHz and 50 MHz; and between 10 MHz and 20 MHz.

Those repetition frequencies may be particularly useful for some applications, for example laser waveguide inscription (in which repetition rate in these ranges can enable the temperature of the material to be inscribed to remain within a desired range during inscription) multi-photon imaging or non-linear spectroscopy. Such applications require sufficient energy to efficiently drive a nonlinear optical process but also benefit from repetition frequencies in these range, for example by improving the signal-to-noise ratio in a detected signal. The use of such repetition rates may also enable higher power signal pulses to be obtained at desired wavelength ranges.

In operation the signal light may have a signal light wavelength in the range 450 nano-meters to 8,000 nano-meters or 10,000 nano-meters.

In operation each signal pulse may have an energy in at least one of a range from 5 nJ to 200 nJ, a range from 10 nJ to 100 nJ or 200 nJ, and a range from 30 nJ to 75 nJ.

Combinations of those signal repetition frequencies, signal wavelengths and/or signal powers may be unobtainable or difficult to obtain using known systems, and/or may require the use of complex, expensive or fixed wavelength systems. In contrast the OPO may obtain combinations of these signal repetition frequencies, signal wavelengths and/or signal powers directly from the OPO, for example without requiring cavity dumping optics and electronics.

The OPO may further comprise a controller for controlling a pump light source to provide the pump light to the OPO.

In operation the pump light may comprise a series of pump pulses at a pulse repetition frequency, and the pump pulse repetition frequency may be at least one of between 1 MHz and 100 MHz; between 5 MHz and 50 MHz; and between 10 MHz and 20 MHz.

The pump light may have a pump wavelength in the range 400 nano-meters to 2,000 nano-meters.

The pump or signal light usually has a bandwidth over which the pump or signal light amplitude is substantially greater than zero, and the pump or signal wavelength may be the wavelength for which the pump or signal light amplitude is substantially equal to the maximum for the pump or signal bandwidth, and/or may be a wavelength for which the pump or signal light amplitude is greater than a threshold amplitude.

The pump light may have an average power in the range 1 W to 10 W.

Each pump pulse may have a duration in a range from 0.5 pico-seconds to 5 pico-seconds, and/or may have a duration of less than 1 pico-second.

Each pump pulse may have a bandwidth in at least one of a range between 1 nm and 100 nm, and a range between 2 nm and 20 nm.

Each signal pulse may have a duration in a range from 0.5 pico-seconds to 5 pico-seconds and/or may have a duration of less than 1 pico-second.

The cavity may be a free-space cavity.

By providing for a free-space cavity, losses and dispersion within the cavity can be kept relatively low. The relatively low dispersion provided by a free space cavity can enable wavelength tuning over a wide range by variation in the signal path length/cavity length. In contrast, known OPOs that include high dispersion cavities, for example including fibre-optics, can be tuned only over narrow wavelength ranges.

The signal light path may comprise free space over at least one of:—at least 50% of the signal light path length; at least 75% of the signal light path length; and at least 90% of the signal light path length.

The OPO may further comprise tuning means for tuning the wavelength by modifying the signal path length of the resonant cavity.

The tuning means may comprise mechanical means for mechanically modifying the length of the resonant cavity. The OPO may be arranged so that the tuning means can tune the wavelength over a range of at least 10 nm, and/or at least 50 nm, and/or at least 100 nm by varying the length of the resonant cavity.

The system may further comprise cavity dumping means. The cavity dumping means may comprise an acousto-optic modulator.

The OPO may further comprise a pump source for providing the pump light, and the pump source may comprise for example at least one of a fibre laser, a free-space oscillator or a thin disc laser.

The pump source may comprise a Yb:KYW, Yb:KGW or Yb:fibre laser. The fibre laser may not require active cooling, as it may comprise a fibre gain medium with an absorption length that allows for significant heat dissipation.

The pump source may be configured to provide a series of pump pulses at a pulse repetition frequency, and the pump pulse repetition frequency may be at least one of between 1 MHz and 100 MHz; between 5 MHz and 50 MHz; and between 10 MHz and 20 MHz. Each pump pulse may have a duration in a range from 0.5 pico-seconds to 5 pico-seconds, and/or may have a duration of less than 1 pico-second. Each pump pulse may have a bandwidth in at least one of a range between 1 nm and 100 nm, and a range between 2 nm and 20 nm. The pump source may be configured to provide pump light having a pump wavelength in the range 400 nano-meters to 2,000 nano-meters. The pump source may be configured to provide pump light having an average power in the range 1 W to 10 W.

The optically non-linear medium may comprise at least one of MgO:PPLN, PPLN, PPRTA, PPKTA, KTP, KTA, RTA, LBO, PPKNB, KNB, CdSe, AgGaSe2, AgGaS2, BIBO, and GaAs.

The OPO may be configured to operate as a light source for at least one of a laser waveguide inscription system, a non-linear spectrometer, a multi-photon imaging system a stand-off spectroscopy system, a free-space ranging system and a LIDAR system.

In another independent aspect of the invention, there is provided a method of producing signal light using an optical parametric oscillator (OPO) comprising:—
  applying pump light to an optically non-linear medium of the OPO for converting the pump light into the signal light, wherein:—
  the optically non-linear medium is disposed in a resonant cavity of the OPO;
  the resonant cavity is arranged so that the signal light is repeatedly output from and returned to the optically non-linear medium along a signal light path in a continuously repeating cycle; and
  the resonant cavity comprises delay means disposed within the resonant cavity for extending the time taken for signal light output from the optically non-linear medium to return to the optically non-linear medium along the signal light path.

The method may comprise applying a pump beam to the optically non-linear medium to produce a signal beam, and the method may further comprise arranging the delay means so that the width of the signal beam at the optically non-linear medium is less than or equal to a predetermined threshold, for example so that the width of the signal beam is substantially equal to the width of the pump beam. The OPO may comprise focusing means for focusing signal light from the delay means at the optically non-linear medium. The method may comprise arranging the focusing means and delay means to co-operate so that the width of the signal beam at the optically non-linear medium is less than or equal to a predetermined threshold, for example so that the width of the signal beam is substantially equal to the width of the pump beam.

The method may comprise forming an intracavity mode in the optically non-linear medium and re-imaging the intracavity mode in the optically non-linear medium, for example by suitably arranging the delay means and/or the focusing means.

The method may comprise ensuring that the size of the reimaged intracavity mode in the optically non-linear medium is substantially independent of a variation in the signal light path length, for example by suitably arranging the delay means and/or the focusing means.

The method may comprising applying the pump light as at least one pump pulse to produce signal light comprises at least one signal pulse. The method may further comprise arranging the intra-cavity delay means so that in operation each signal pulse returned to the optically non-linear medium substantially overlaps with a pump pulse in the optically non-linear medium.

The method may comprise arranging the delay means so that a signal pulse is returned to the optically non-linear medium at a repetition frequency of at least one of between 1 MHz and 100 MHz; between 5 MHz and 50 MHz; and between 10 MHz and 20 MHz.

The signal light may have a signal light wavelength in the range 450 nano-meters to 8,000 nano-meters or 10,000 nano-meters. Each signal pulse may have an energy in at least one of a range from 10 nJ to 200 nJ, a range from 10 nJ to 100 nJ and a range from 30 nJ to 75 nJ.

The method may comprise applying the pump light as a series of pump pulses at a pulse repetition frequency, and the pump pulse repetition frequency may be at least one of between 1 MHz and 100 MHz; between 5 MHz and 50 MHz; and between 10 MHz and 20 MHz.

The pump light may have a pump wavelength in the range 400 nano-meters to 2,000 nano-meters.

The method may comprise applying pump light having an average power in the range 1 W to 10 W. The method may comprise applying pump pulses having a duration in a range from 0.5 pico-seconds to 5 pico-seconds, and/or having a duration of less than 1 pico-second.

Each signal pulse may have a duration in a range from 0.5 pico-seconds to 5 pico-seconds and range, and/or has a duration of less than 1 pico-second.

The method may comprise tuning the signal wavelength by modifying the signal path length of the resonant cavity.

The method may comprise operating the OPO as a light source for at least one a laser waveguide inscription system, a non-linear spectrometer, a multi-photon imaging system a stand-off spectroscopy system, a free-space ranging system and a LIDAR system.

In a further independent aspect of the invention there is provided a method of manufacture of an optical parametric oscillator (OPO) comprising:— providing a resonant cavity for signal light;

disposing in the resonant cavity an optically non-linear medium for converting pump light into the signal light; and arranging the resonant cavity so that in operation signal light is repeatedly output from and returned to the optically non-linear medium along a signal light path in a continuously repeating cycle, wherein the resonant cavity comprises delay means and the method comprises disposing the delay means within the resonant cavity so that in operation the time taken for signal light output from the optically non-linear medium to return to the optically non-linear medium along the signal light path is extended.

Alternatively or additionally, there may also be provided one or more of the following:—a high average power, low pulse repetition rate pump laser providing nearly picosecond or sub-picosecond pulses; a means of focusing and coupling the pump light into the OPO cavity to form a tightly focused waist in the nonlinear crystal; a high gain, broadband nonlinear gain medium, phase-matchable for the generation of near and mid-infrared wavelengths; a means of reducing Fresnel loss at the crystal faces; cavity mirrors with high transmission at the pump wavelength and high reflectivity at the signal or idler wavelengths; a relay imaging system, or multi-pass mirror system, to periodically re-image the cavity mode in a way that allows the length of the cavity to be extended without changing the size of the intracavity mode formed in the nonlinear crystal; a mechanical means for adjusting the cavity length to bring the OPO cavity into synchronism with the pump laser pulses; a means of output coupling to extract a fraction of the intracavity power; short focal length (for example <500 mm) mirrors for creation of a tightly focused intracavity waist located in the centre of the nonlinear crystal; long focal length (for example >500 mm) intracavity relay-imaging optics; a Yb:fibre pump laser producing >6 W average output power, sub-picosecond pulses at a wavelength of 1060 nm and a repetition rate of 15.3 MHz; a focusing lens (for example of length ~100 mm) to introduce the pump light into the nonlinear crystal; a MgO:PPLN nonlinear crystal with poling periods from 28-31 μm and anti-reflection coated plane-parallel faces for the wavelength range 1000-1600 nm; cavity mirrors with high transmissions at 1060 nm and 3400 nm, and high reflectivities from 1400-1600 nm; an output coupler with a transmission in the 20-25% range; and a means of cavity dumping the intracavity pulses. There may also be provided intracavity relay imaging in a synchronously-pumped ultrafast optical parametric oscillator (OPO) to allow pumping by a low-repetition-rate high-energy modelocked laser. The OPO may be relatively inexpensive and easy-to-maintain and may be used to replace more expensive, more difficult to maintain amplifier systems, for example systems in which an amplified Ti:sapphire laser is used to pump an optical parametric amplifier. Embodiments of the OPO system, being relatively simple can also be constructed to be relatively compact.

Any feature in one aspect of the invention may be applied to other aspects of the invention, in any appropriate combination. For example, apparatus features may be applied to method features and vice versa.

BRIEF DESCRIPTION OF THE DRAWINGS

At least one embodiment of the invention will now be described, by way of example only, with reference to the accompanying drawings, in which:

FIGS. 7a to 7d are graphs of intensity and phase for a signal pulse;

FIGS. 8a to 8d are graphs of intensity and phase for a further signal pulse.

DETAILED DESCRIPTION OF EMBODIMENTS

Figure 1:
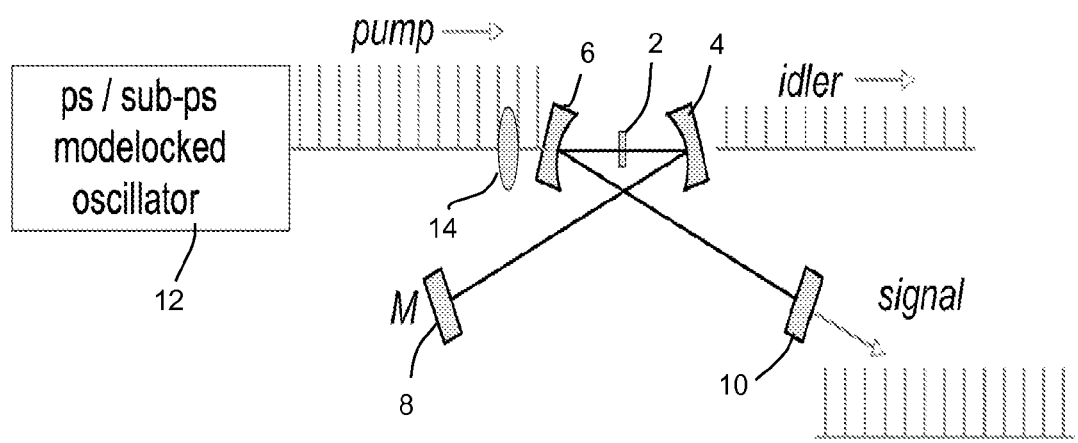
FIG. 1 is a schematic diagram of a known, synchronously pumped optical parametric (OPO)

Throughout the following description identical reference numerals will be used to identify like parts.

FIG. 1 is a schematic diagram of a known, synchronously pumped optical parametric oscillator (OPO). The OPO comprises a non-linear crystal 2 contained in a resonant optical cavity. The resonant optical cavity is defined by two focussing mirrors 4, 6, a further mirror (M) 8 and output coupler 10. The output coupler 10 is a partially reflective mirror. A picosecond or sub-picosecond mode-locked oscillator 12 is used as a pump source, and is aligned with a focussing lens arrangement 14.

In operation, pump pulses with a fixed repetition frequency (typically ~100 MHz) are focused by the focussing lens arrangement into the nonlinear crystal 2 contained in the resonant optical cavity. Each pump pulse forms, with radiation at the signal frequency, a mode in the nonlinear crystal, which generates a signal pulse and an idler pulse. The resonant cavity is arranged so that the signal pulse is reflected back into the non-linear crystal in synchronisation with the next pump pulse so that the signal pulse and the pump pulse overlap in the non-linear crystal, causing generation of further radiation at the signal pulse wavelength and increasing the signal pulse amplitude. The signal pulse repetition frequency is synchronous with the pump laser pulse repetition frequency.

The signal pulses normally leave the cavity via the output coupler 10, which has a reflectivity in the 1-50% range. The idler pulses can be output-coupled via the mirror 4 adjacent to the crystal 2, which is normally designed to have high transmission at the idler wavelength. The OPO includes a controller and an actuator (not shown) that is operable to translate mirror (M) 8. Translation of mirror (M) 8 is sufficient to tune the signal centre wavelength over many tens of nanometers.

The mode size in the nonlinear crystal 2 of FIG. 1 is determined by the cavity length and the curvatures of the two focusing mirrors 4, 6 positioned around the crystal.

Figure 2:
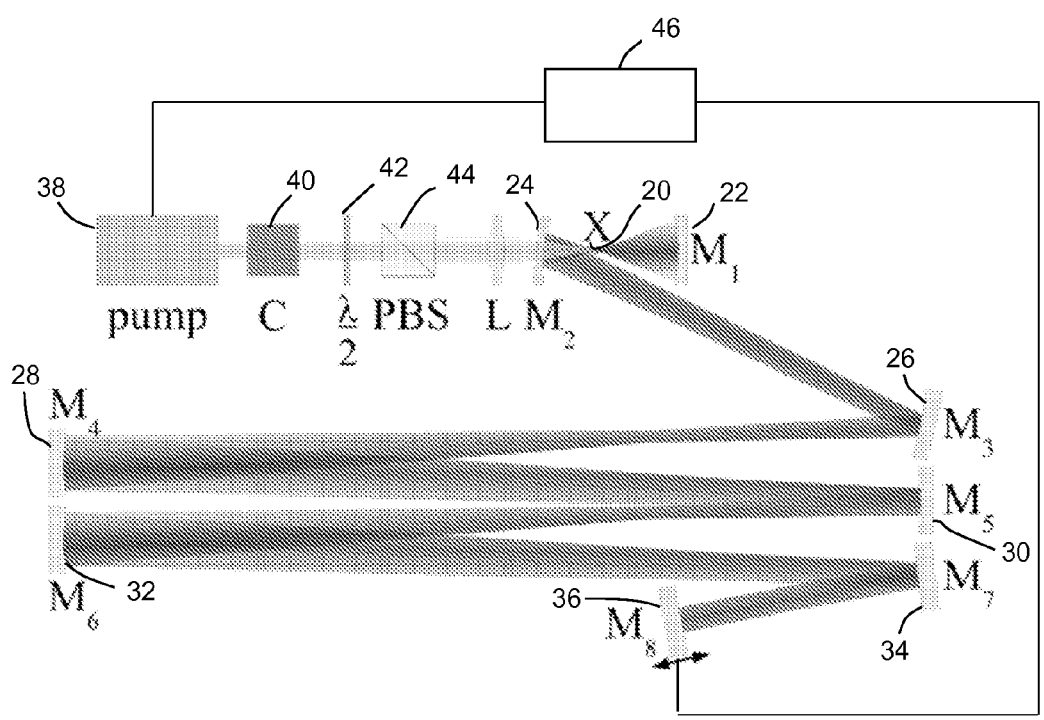
FIG. 2 is a schematic diagram of a synchronously pumped optical parametric oscillator (OPO) according to a first embodiment.

FIG. 2 illustrates an OPO system according to one embodiment. The OPO comprises a non-linear crystal 20 in the form of a MgO-doped periodically-poled LiNbO3 (MgO:PPLN) crystal consisting of four uniform gratings with periods ranging from 28-31 µm and with a length of 1 mm. The crystal was fabricated with plane-parallel faces which were anti-reflection coated over a wavelength range from 0.8-1.55 µm. To permit temperature tuning, and as an added precaution against photorefractive damage, the crystal was mounted in an oven and its temperature was maintained at 85° C.

The non-linear crystal 20 is positioned in a resonator based upon an asymmetric "V-cavity" design, which has a focusing section around the crystal 20 comprising a concave end-mirror (M1) 22 with a radius of 150 mm and a turning mirror (M2) 24 with a radius of 200 mm. The position of the non-linear crystal is indicated by X in FIG. 2.

The turning mirror (M2) 24 is arranged, in operation, to collimate an intracavity beam into an arm of length 9.55 m that comprises a relay-imaging arrangement. The relay imaging arrangement comprises two pairs (M3, M4; M5, M6) of 2000 mm radius concave mirrors 26, 28, 30, 32. The arm also includes a further mirror (M7) 34 and an output coupler (M8) 36. The further mirror (M7) 34 is arranged to direct the intracavity beam between the output coupler 36 and the relay imaging arrangement. The total length of the cavity, measured between the curved end-mirror (M1) 22 and the output coupler (M8) 36, is 9.8 m. As discussed in more detail below, that length of 9.8 m is matched to a synchronous pumping pulse repetition rate of 15.3 MHz.

The optical coupler comprises an actuator (not shown) that is operable to move the output coupler (M8) 36 thereby to vary the length of the cavity. The actuator is controlled by a controller 46, for example a suitably programmed and interfaced PC or dedicated controller.

Details of the optical elements used, and the distances between those optical elements, in the embodiment of FIG. 1 are given in Tables 1 and 2. All mirror-folding angles are small (<2°), minimizing astigmatism caused by the curved mirrors

TABLE 1

| Distance | Length (mm) |
| --- | --- |
| Between $M_1$ and X | 150 |
| Between X and $M_2$ | 100 |
| Between $M_2$ and $M_3$ | 1000 |
| Between $M_3$ and $M_4$ | 2000 |
| Between $M_4$ and $M_5$ | 2000 |
| Between $M_5$ and $M_6$ | 2000 |
| Between $M_6$ and $M_7$ | 2000 |
| Between $M_7$ and $M_8$ | 550 |

TABLE 2

| Optical element | Details |
| --- | --- |
| $M_1$ | Diameter 12.5 mm Radius 150 mm (concave) |
| X | MgO: PPLN crystal. Length 1 mm; Height 11 mm; Width 0.5 mm |
| $M_2$ | Diameter 12.5 mm Radius 100 mm (concave) |
| $M_3$ | Diameter 12.5 mm Radius 2000 mm (concave) |
| $M_4$ | Diameter 12.5 mm Radius 2000 mm (concave) |
| $M_5$ | Diameter 12.5 mm Radius 2000 mm (concave) |
| $M_6$ | Diameter 12.5 mm Radius 2000 mm (concave) |
| $M_7$ | Diameter 12.5 mm Plane |

TABLE 2-continued

| Optical element | Details |
| --- | --- |
| $M_8$ | Diameter 12.5 mm Plane |
| L | Diameter 12.5 mm, focal length of 100 mm |

The relay imaging arrangement comprises two pairs of concave mirrors with focal length f, forming a 4f system in which the physical separation of the mirrors is 2f and a point at a distance f before the first mirror in a pair is imaged to a point a distance f after the second mirror in a pair. Although two pairs of mirrors are used in the relay imaging arrangement of FIG. 2, there is in principle no limit to the number of relay mirror pairs that can be used.

The system also includes a commercial sub-picosecond Yb:fiber laser (Fianium FemtoPower 1060-10) as the pump laser 38. The pump laser 38 has a simple master-oscillator power-amplifier (MOPA) architecture based on a picosecond master oscillator followed by a power amplifier stage in which the picosecond pulses acquire a broad bandwidth through self-phase modulation. An Yb:fiber MOPA represents an inexpensive high-energy source, where the repetition rate can be readily reduced to frequencies of 10 MHz or below. The pump laser 38 is connected to the controller 46, which is configured to control operation of the pump laser 38.

The optical axis of the pump laser 38 is aligned with pump optics that, in operation, couple the pump beam into the OPO. The pump optics comprise a variable compressor 40 comprising a pair of fused-silica transmission gratings (Ibsen Photonics), a variable attenuator comprising a half-wave plate 42 and a polarizing beam splitter 44, and a focusing lens 46. The focusing lens is a single 100 mm focal-length lens placed 750 mm after the laser head.

The pump optics and pump laser operating parameters are selected to provide a pump beam radius that reduces the risk of surface damage to the MgO:PPLN crystal whilst providing a compromise between parametric gain and damage considerations. In the embodiment of FIG. 2, a pump beam radius of 40 nm is used. This focal size is also readily compatible with the minimum spot size to which the pump pulses could be focused. The pump laser exhibited a beam quality factor of $M^2 \sim 1.3$, which originates from its use of 50 nm-diameter large-mode-area fiber within the Yb:fiber amplifier, and is poorer than that obtained from solid-state lasers such as Ti:sapphire that are more commonly used as pump sources in prior art systems. It is a feature of the embodiment of FIG. 2 that satisfactory results can be obtained using such a fibre pump laser.

In one mode of operation the pump laser 38 is operated at a centre wavelength of 1064 nm with a pulse-repetition frequency of 15.3 MHz. The resulting chirped pulses have durations of 7 ps with a bandwidth of approximately 25 nm and energies of around 700 nJ. The variable compressor 40 compresses the pulses. Although the chirp on the output pulses is not fully compressible, the grating compressor 40 achieves pulse durations of 437 fs (FWHM) with an efficiency of 63.5%.

The pump beam, consisting of the pump pulses is introduced into the OPO cavity by pumping through one of the OPO focusing mirrors 24. The pump beam is focused to form a waist inside the nonlinear crystal 20 and generates signal and idler pulses in the non-linear crystal. In a variant of the embodiment of FIG. 2, the pump beam is not introduced to the cavity through the focusing mirror 24, but instead non-collinear phase-matching is used to introduce the pump at an angle to the cavity axis, allowing the pump light to be focused directly into the crystal.

The generated signal pulses are reflected within the cavity (between mirrors M1-M8, 22-36) and returned to the non-linear crystal 20. In order for optical parametric oscillation to occur the repetition rates of the pump and the repetition rate for the signal pulse within the OPO cavity must be matched (for example, to within a few tens of microns) so that arrival of each successive pump pulse at the non-linear crystal is synchronised with the arrival of the intracavity signal pulse and the pump pulse and the signal pulse overlap in the non-linear crystal 20. That corresponds, for example, to a requirement that the time for one pulse roundtrip within the OPO cavity equals the roundtrip time in the pump laser cavity.

In the example of FIG. 2, the pump laser 38 operates at a pulse repetition rate of 15.3 MHz, corresponding to a roundtrip cavity length of 19.6 m. The OPO is therefore configured in a standing-wave cavity to have a length, measured from one end mirror 22 to the other 36 of 9.8 m, as can be understood from Table 1.

The pump optics are selected so that the pump beam within the non-linear crystal 20 has a diameter that approximately matches the diameter of the intracavity signal beam that is generated, which in turn is defined by the choice of mirror curvatures in the cavity. In the embodiment of FIG. 2, the intracavity signal beam has a diameter less than 3.4 mm at all points in the cavity.

In operation, the amplitude of the intracavity signal pulse increases until the amplification of the signal provided by the pump pulse in the non-linear crystal 20 matches the losses from the cavity. A proportion of the signal pulse is output from the output coupler 36 for each passage of the signal pulse through the resonant cavity. In the embodiment of FIG. 2, the output coupler 36 has a coupling efficiency of 22%.

The OPO can be tuned to provide output pulses of desired wavelength using cavity length tuning, by varying the position of output coupler 36 under control of the controller 46. As the cavity length is modified, the centre wavelength of the intracavity signal pulses changes in order to maintain synchronism with the pump pulses, so maximising the gain in the OPO. In cavities with a net positive intracavity group-delay dispersion, a physical shortening of the OPO cavity leads to a corresponding decrease in the signal wavelength, since this change incurs a greater group delay in the cavity elements, so compensating for the shorter physical length. This tuning behaviour is linked directly to the intracavity group-delay dispersion of the OPO, with higher dispersion leading to more limited tuning. In the system of FIG. 2, by using a free-space cavity that exhibits relatively low dispersion, smooth cavity-length tuning can be obtained over a range comparable to the bandwidth of the intracavity optics.

It can be understood that the relay imaging arrangement provides a significant lengthening of the resonant cavity. That in turns means that optical parametric oscillation can be obtained at lower pump repetition frequencies than would otherwise be the case. The pulse energy from a pump source, for example, a mode-locked oscillator is given by its average output power divided by its pulse repetition frequency. Therefore, by reducing the pulse repetition frequency (by use of a relay imaging arrangement in the example of FIG. 2) while at the same time scaling up the pump laser power, OPO output signal pulses with increased energies can be obtained. As well as enabling the reduction in repetition frequency by lengthening the resonant cavity, the relay imaging arrangement also provides an effective way of maintaining the signal beam at a desired diameter (substantially the same size as the pump beam) within the non-linear crystal 20 whilst also keeping intracavity losses low.

Figure 3:
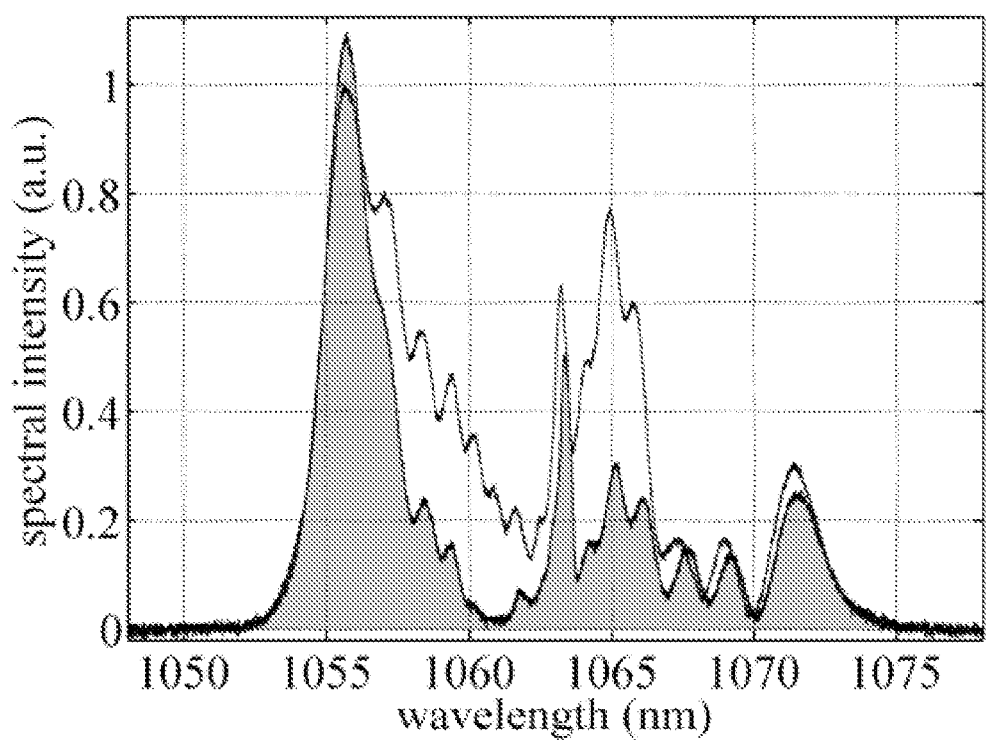
FIG. 3 is a graph of spectral intensity as a function of wavelength for a depleted and undepleted pump.

The pump depletion was investigated for the embodiment of FIG. 2 under maximum output power and a comparison of the pump spectra measured after the crystal with the OPO oscillating and blocked is shown in FIG. 3, which shows the spectral intensity as a function of wavelength for the depleted pump (dark area) and un-depleted pump (light area) with the intensity scale normalised to the undepleted spectrum. Strong depletion was observed between 1057 nm and 1067 nm, with evidence of back-conversion from the signal to the pump at 1056 nm. This back-conversion can be understood as resulting from uncompressible chirp in the wings of the pulse spectrum caused by the self-phase modulation that occurs in the Yb:fiber amplifier. A conversion efficiency based on the difference in the areas under both spectra was calculated to be 36%.

Figure 4:
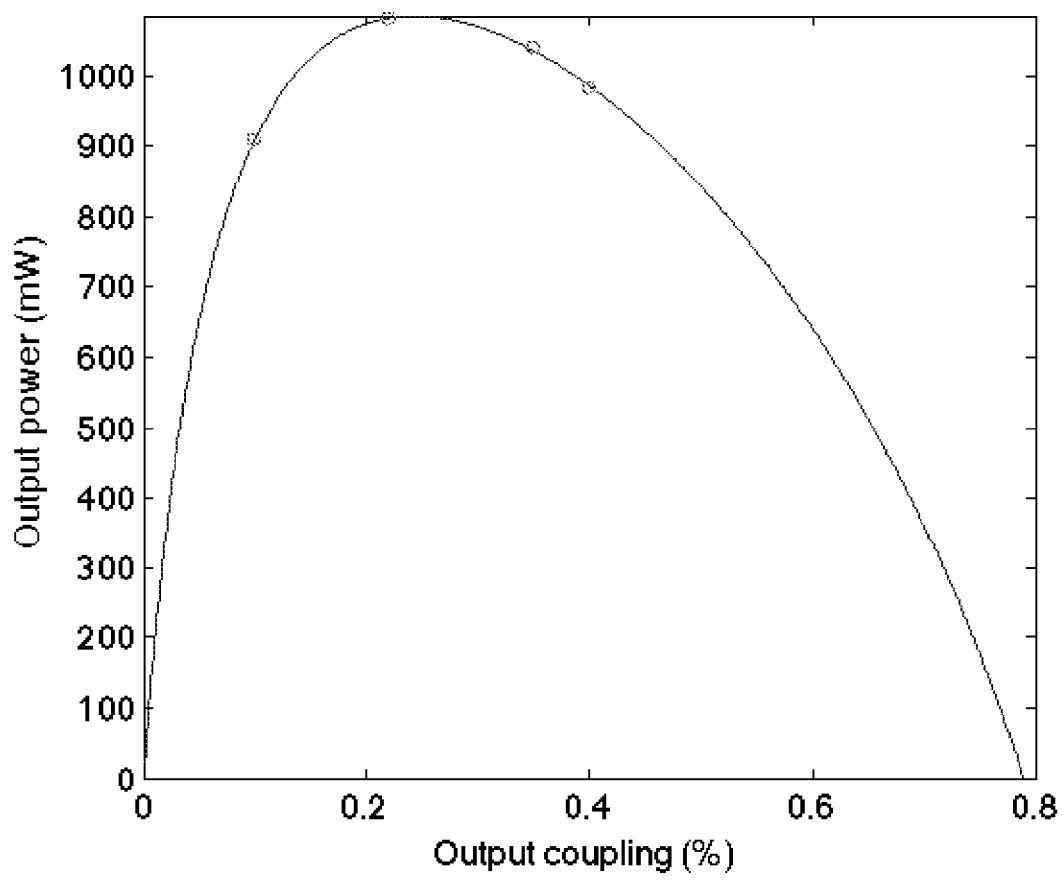
FIG. 4 is a graph of measured average output power as a function of output coupling.

When a 22% output coupler is used as the output coupler 38 for the embodiment of FIG. 2 the maximum output power for the OPO at a centre wavelength of 1535 nm is 1.09 W for a pump power of 6.4 W, implying a signal extraction efficiency of 17.0% and an idler extraction efficiency of 7.6%. The idler efficiency can be inferred using the Manley-Rowe relations, taking an idler wavelength of 3.42 p.m. The difference in the pump depletion and the total extraction efficiency indicates the parasitic loss in the cavity. By taking the reflectivity of the cavity mirrors to be 99.9% a reflectivity loss for each cavity roundtrip of 1.5% is obtained, leaving a 9% loss at the MgO:PPLN crystal 20 which can be explained by a 2% residual reflectivity at the antireflection-coated crystal faces. This loss value is corroborated by independent measurements of the output power for a range of output coupler transmissions which show that the residual parasitic losses are approximately 7.5% and that the optimum output coupling efficiency is 24%, close to that used experimentally in the preferred embodiment. That is illustrated in FIG. 4, which is a graph of measured average output power as a function of output coupling for the embodiment of FIG. 2 with 6.3 W pump power for output couplers 38 with transmissions of 10%, 22%, 35% and 40% (symbols), shown with a fit to theory (line) for an unsaturated roundtrip gain coefficient of 1.6, parasitic losses of 7.5% and a maximum output power of 1085 mW.

Figure 5:
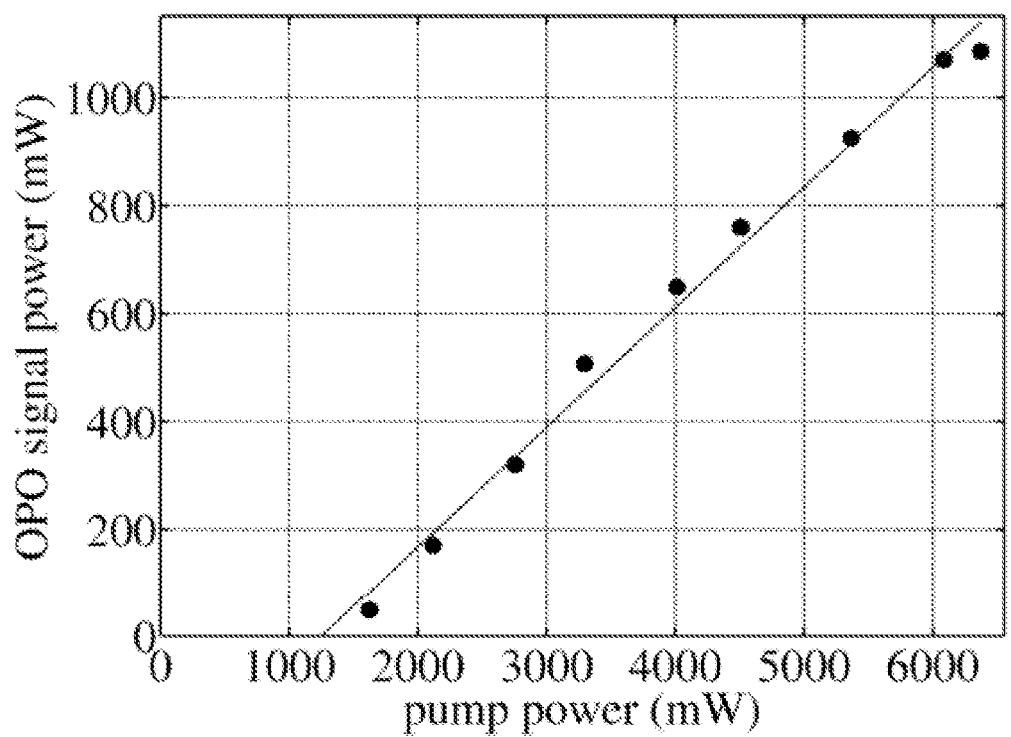
FIG. 5 is a graph of signal output power as a function of pump power for a 22% output coupler.

The slope efficiency, measured with a 22% output coupler was determined to be 22.2% with an estimated pump threshold of 1.25 W, as indicated in FIG. 5, which is a graph of signal output power (solid circles) as a function of pump power for a 22% output coupler, and a linear fit through the data (blue line), extended to cross the abscissa. The slope efficiency was determined to be 22% and the pump threshold was estimated to be 1.25 W from the graph.

The use of an extended cavity for a synchronously-pumped OPO raises the question of whether the system may be vulnerable to environmental noise because of the greater number of mirror mounts and longer free-space path traveled by the intracavity beam, as it is possible that cavity length fluctuations of a few microns could be sufficient to lead to instability. Therefore, measurements of power spectral densities for the pump and signal outputs were performed, using Si and InGaAs photodiodes respectively. The measurements were performed for the frequency range from 1 Hz to 100 kHz.

Figure 6:
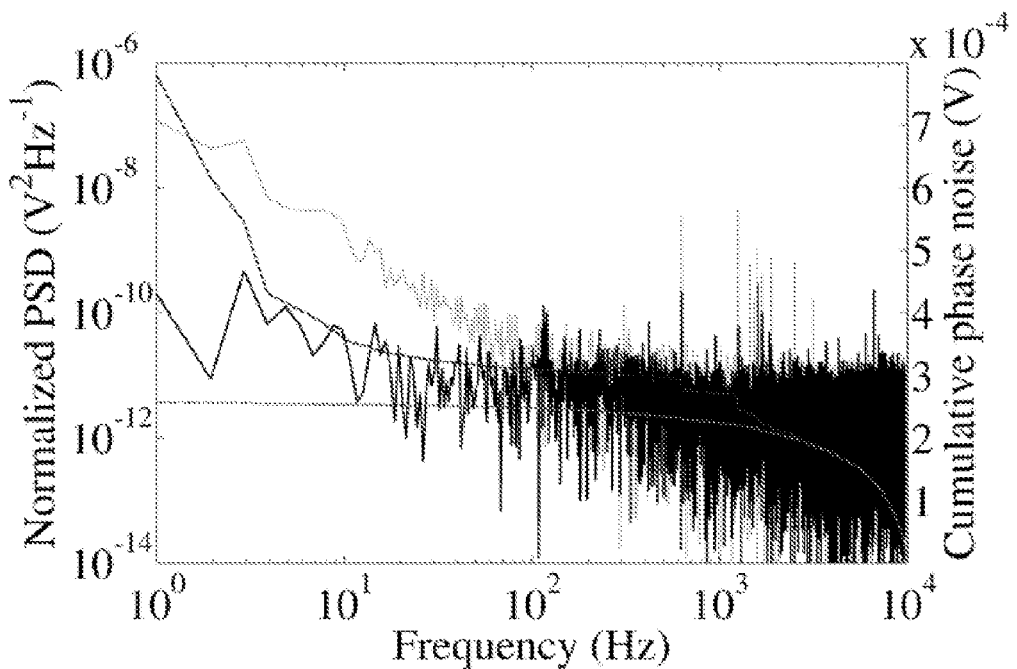
FIG. 6 is graph of power spectral density (left axis) and cumulative intensity noise (right axis) for pump and OPO signals as a function of frequency.

The results of the measurements are shown in FIG. 6, which is a graph of power spectral density (left axis) and cumulative intensity noise (right axis) for the pump and OPO signals as a function of frequency. It can be seen from FIG. 6 that while the noise measurement shows that the OPO pulses possess greater intensity noise than those from the pump laser, the absolute value of the noise is at a low level (<0.1%), and indistinguishable from the pump laser at frequencies higher than those typically associated with acoustic vibrations. Comparison of the cumulative phase noise shows a division at 2 kHz, increasing at lower frequencies. An implementation of active cavity-length stabilization with a bandwidth of at least 2 kHz would be expected to reduce the noise in the acoustic region significantly. In a boxed configuration, the output power of the OPO was very stable and only exhibited a slow drift as the lab temperature changed. The signal pulse durations for the mode of operation described above for the embodiment of FIG. 2, were between 1.5 and 1.7 ps, with bandwidths in the regions of 2-20 nm, as shown in FIGS. 7 and 8.

Figure 7A:
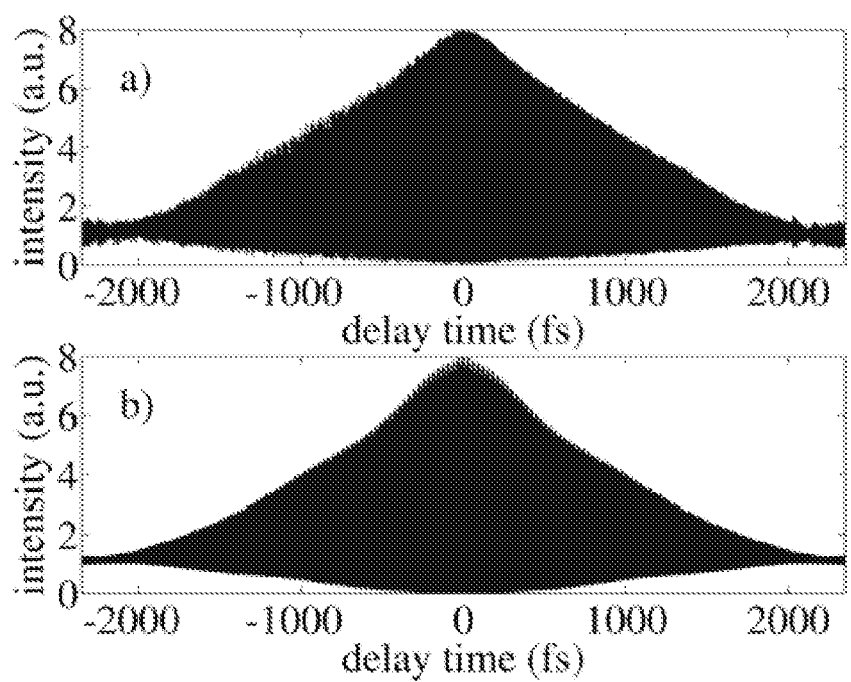
Figure 7C:
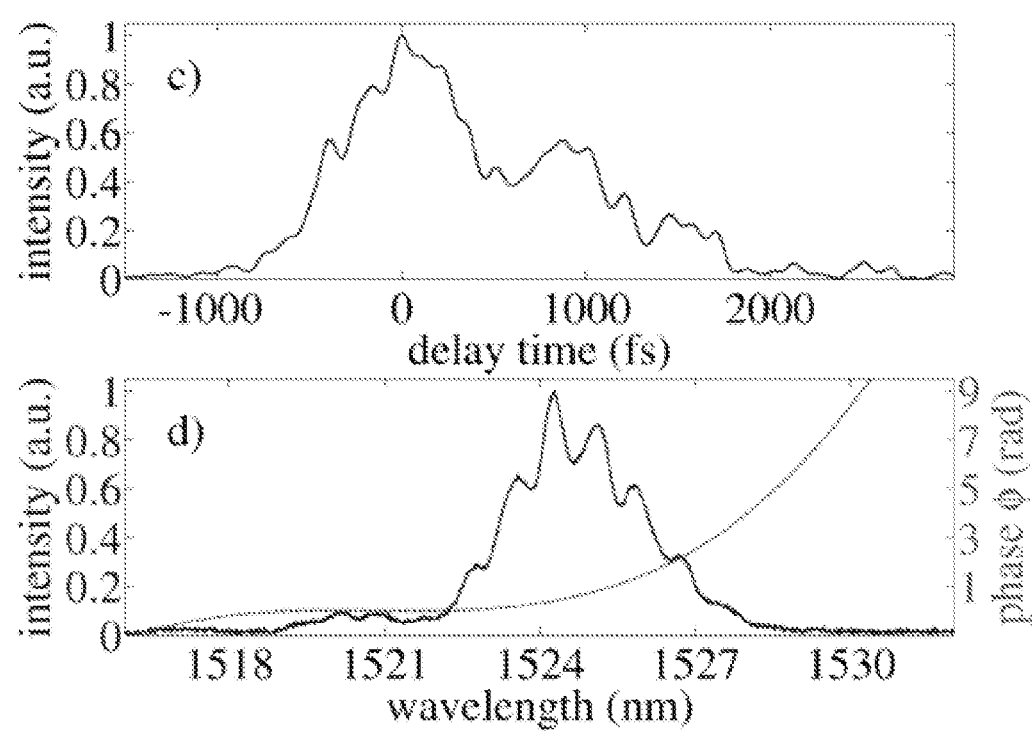
Figure 8A:
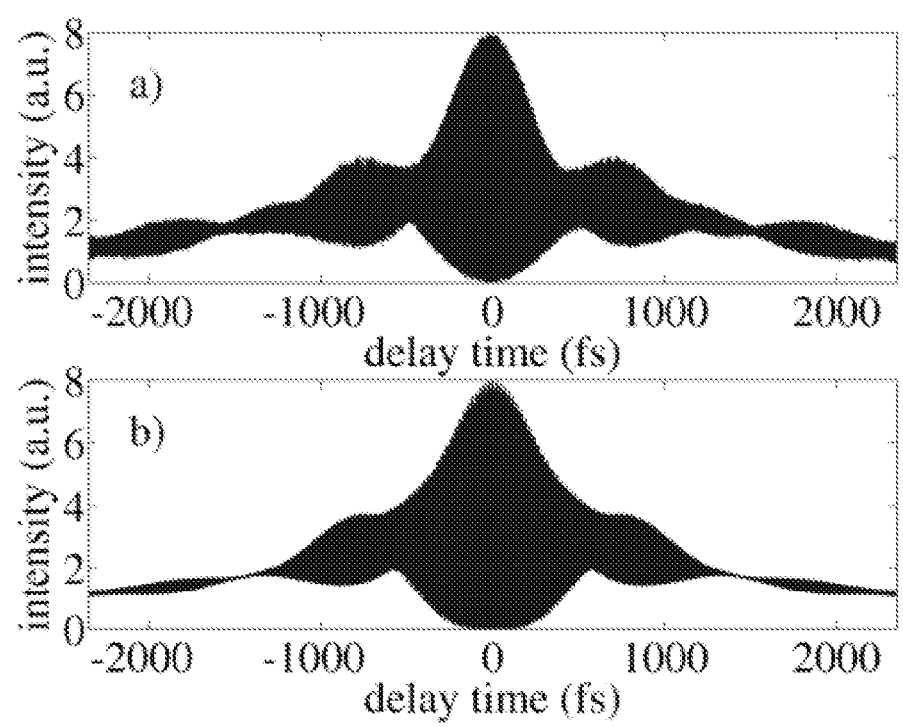
Figure 8C:
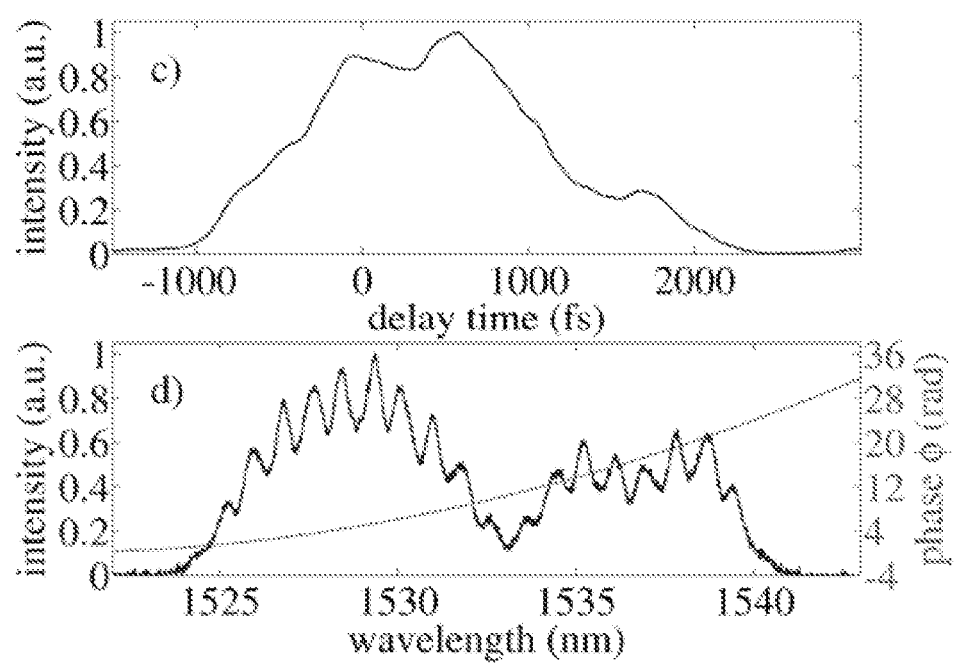

FIGS. 7a and 7b are graphs of intensity as a function of time for experimental and fitted autocorrelation respectively, indicating a signal pulse duration of 1.47 ps. FIG. 7c is a graph of temporal intensity of the pulse (calculated from the measured spectral intensity) as a function of time, and FIG. 7c is a graph of fitted phase as a function of time. The data for FIG. 7 were obtained at 1080 mW signal power.

FIGS. 8a to 8d are equivalent to FIGS. 7a to 7d, and represent measurements on a signal pulse that was determined to have a duration of 1.67 ps. The data for FIG. 8 were obtained at 980 nW signal power.

It can be seen from the measurements described above that the OPO system can be capable of producing high-energy output pulses (for example, in the range 30-72 nJ in one example) in the near and mid-infrared. In some cases the absolute energies of the output pulses are approximately 50 times greater than those from at least some previously reported Yb:fibre-pumped OPOs. Furthermore, the high energy pulses may be delivered in a repetition-rate range which falls in a gap between lower frequencies from known amplified systems (1-200 kHz) and known synchronously-pumped optical parametric oscillators (~80 MHz). It can also be seen that the OPO can be stable even when it comprises a long, low-repetition-rate cavity, as described, and that it may exhibit acceptably low intensity noise in free-running operation. In addition, the excess noise above that of the pump laser may be confined to acoustic frequencies below 2 kHz which, in further embodiments, can be mitigated using electronic stabilisation techniques.

The OPO system can able to produce both signal and idler pulses at similar energies (for example, 72 nJ and 30 nJ respectively in one mode of operation) and at the same repetition rate (for example, 15.3 MHz). Those features are in contrast to some known systems in which idler pulses may be produced only at low energy, and idler pulses and signal pulses may have different repetition rates.

In further embodiments, any of a wide variety of nonlinear gain media are used, instead of MgO:PPLN, for example PPLN, PPRTA, PPKTA, KTP, KTA, RTA, LBO, PPKNB, KNB, CdSe, AgGaSe2, AgGaS2, BIBO, GaAs, or similar materials.

The pump source is not limited to the Yb:fiber laser illustrated in FIG. 2, and any suitable pump source can be used, for example any fibre or free-space oscillator which possesses sufficient gain bandwidth to produce few picosecond or sub-picosecond pulses at multi-Watt average powers and pulse repetition rates in the 1-25 MHz range. A Yb:KYW, Yb:KGW or similar gain medium in a free-space cavity, or a thin disc laser geometry, is used as the pump source in some embodiments.

The relay imaging array arrangement is replaced in certain embodiments by other arrangements for extending the time taken for signal light to return to the optically non-linear crystal in the resonant cavity, for example other arrangements that lengthen the path for signal light in the resonant cavity. In some such arrangements, one or more pairs of mirrors are arranged so that the signal light passes multiple times between the or each pair before returning to the non-linear crystal. The mirrors may be arranged, for example, as a Herriott cell.

The resonant cavity of the embodiment of FIG. 2 is a standing wave cavity. Any other suitable type of resonant cavity may be used, for example a ring cavity.

The tuning of the output signal wavelength of the embodiment of FIG. 2 by tuning the cavity length has been described. In practice, effective cavity length tuning is contingent on configuring the cavity with a sufficiently small dispersion to permit smooth and wide cavity length tuning, as is the case for the embodiment of FIG. 2. Coarse tuning of the signal wavelength can also be obtained by grating tuning in which a quasi-phase-matched crystal containing two or more sub-crystals of different domain inversion periods is used as the non-linear medium. By re-positioning the crystal so that the pump and resonant signal beams overlap in a differently-poled region it is possible to obtain coarse tuning.

In the embodiment of FIG. 2, oscillation is obtained at the shorter wavelength of the two wavelengths generated by the pump beam in the non-linear crystal, and thus the signal is the shorter wavelength and the idler is at the longer wavelength. The OPO system can also be configured so that oscillation at the longer wavelength is provided, and that longer wavelength is then treated as the signal with the shorter wavelength treated as the idler. The cavity reflectivity at the shorter and longer wavelengths determine the mode of operation. The output coupling may be chosen to maximise the extractable output power. The non-resonant wave (the idler signal) can be extracted through the first mirror 22 after the crystal by using a mirror coating and substrate material that provides high transmission at the non-resonant wavelength. Collimating optics (not shown) outside the cavity may be used to efficiently collect the non-resonant light. In other alternative embodiments, the resonant cavity of the OPO is resonant at both the idler and signal wavelengths. In further embodiments, the resonant cavity is resonant at the pump wavelength as well as at the signal wavelength. Such doubly-resonant or pump-enhanced OPOs can be obtained by suitable choices of high or low reflectivities at the pump, signal or idler wavelengths.

Figure 9:
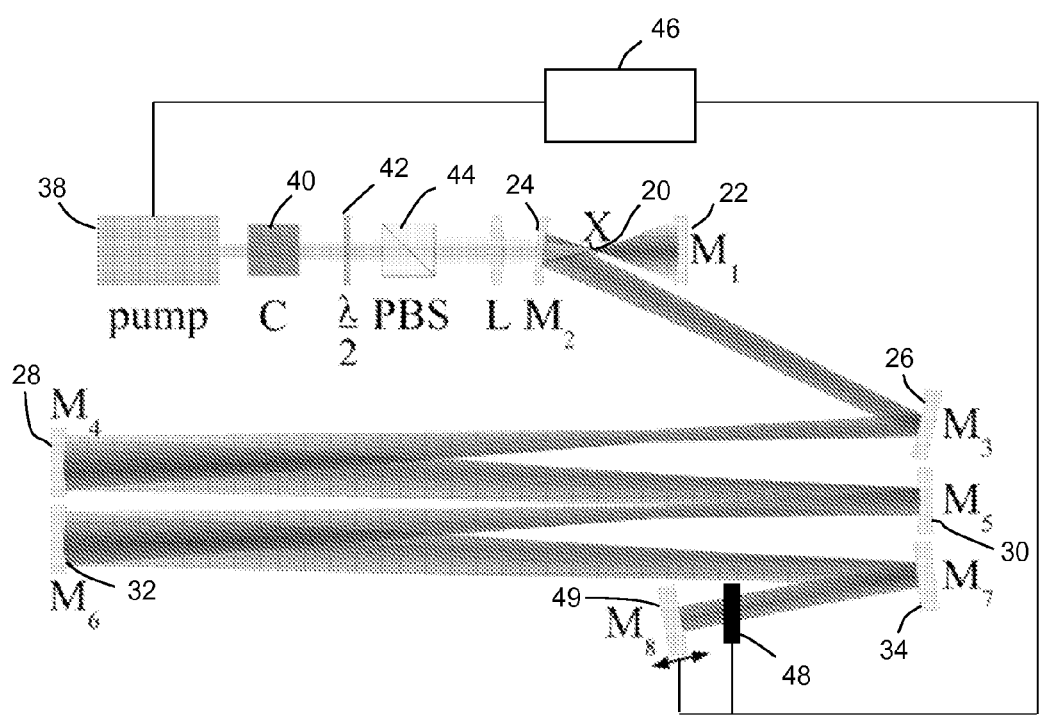
FIG. 9 is a schematic diagram of a synchronously pumped optical parametric oscillator (OPO) according to a further embodiment.

In the embodiment of FIG. 2, the output coupler 36 is used to extract signal light, with a proportion (for example 10%) of the signal light hitting the coupler 36 being transmitted through the coupler 36 to provide an output signal. That provides for steady state operation with the output pulses having the same repetition frequency as the pump pulses. In alternative embodiments an intracavity cavity dumper, for example an acousto-optic modulator, is inserted to switch out resonant pulses, thus providing an output pulse energy approaching the energy of the circulating intracavity pulses. An example of such an alternative embodiment is illustrated in FIG. 9, in which an acousto-optic modulator 48 is positioned between the mirrors 34, 49 in the resonant cavity. The acousto-optic modulator 48 is controlled by the controller 46, and is periodically operated to dump the circulating signal pulse as an output signal. The output signal pulse repetition frequency for the embodiment of FIG. 9 is lower than that of the embodiment of FIG. 2, as the intracavity pulse pump energy is usually allowed to build up for a number of pulse pump cycles (for example, 10) between each output pulse dump. In one mode of operation, the embodiment of FIG. 9 provides output signal pulses each of energy greater than 1 μJ pulses, at >1 MHz repetition rates. In a variant of the embodiment of FIG. 9, the acousto-optic modulator 48 is positioned between two additional curved mirrors (not shown) in the cavity. That can provide a narrower beam in the acousto-optic modulator 48, which allows for a faster modulation rate, which can assist in selection of single pulses.

The reflectivity of the mirror 49 in the embodiment of FIG. 9 can be higher than the corresponding mirror 36 in the embodiment of FIG. 2, as it does not have to function as an output coupler. Therefore, the maximum intracavity pulse pump energies are usually higher than is the case for the embodiment of FIG. 2, as the steady state losses from the cavity are lower.

The output signals from the embodiments of FIGS. 2 and 9 can be coupled to any appropriate optical arrangements (not shown), for example focusing, collimating, or filtering arrangements, that are required for a particular application.

The output signals can be used for a range of applications, for example linear and nonlinear spectroscopy, waveguide inscription, and free-space metrology.

Many infrared materials which are interesting candidates for ultrafast waveguide inscription cannot be inscribed at short wavelengths, and require irradiation at wavelengths considerably longer than 1 µm because they are not transparent at the common wavelengths of 800 nm and 1060 nm at which high energy multi-MHz repetition rate pulses are currently available using known techniques. For example, inscription in silicon requires pulses longer than 1.1 µm, germanium 1.8 µm and chalcogenide glasses from 0.6-1.5 µm. High-energy near-infrared oscillators, such as those described herein, are therefore required for this application, particularly those with diffraction-limited outputs that permit the lowest modification threshold to be achieved by using high-numerical-aperture focusing.

Turning to non-linear spectroscopy, nonlinear spectroscopic techniques (both time-resolved and frequency-resolved), including CARS (coherent anti-stokes Raman spectroscopy), 2D spectroscopy, Raman spectroscopy, four-wave mixing, two-photon spectroscopy, transient grating measurements and Z-scan measurements can benefit from near and mid-IR pulses with high energies (so permitting high absolute signal levels due to the high peak power of the pulses) and high repetition rates (>>kHz) which permit low-noise lock-in detection at frequencies well removed from the acoustic frequency band, suppressing 1/f technical noise.

High frame rate multi-photon microscopy requires the high repetition rates of oscillators in order to be able to acquire laser-scanned microscope images in an acceptably brief time interval. Two-photon and three-photon microscopies require, for some samples such as semiconductors, infrared pulsed excitation. The use of a low-repetition rate oscillator, such as those described herein, allows peak powers to be increased, while still maintaining a sufficiently high pulse repetition rate to allow rapid image acquisition. The use of high peak powers can be beneficial in some samples because it permits the same nonlinear signal level to be achieved for lower average powers, reducing the thermal load on the sample, for example a cell.

The OPO system could also be used as a signal source for mid-IR stand-off detection, which could be used to detect spectral signatures of various substances. Thermal broadband sources have poor spatial coherence, hindering stand-off detection, in which a target to be measured may be remote, and at variable or ill-defined distance from the detection apparatus. The OPOs described herein have sufficient energy and beam quality to illuminate a target with a broadband mid-IR pulse and allow a measurable amount of back-scattered light to be recorded and spectroscopically analysed, for example using FTIR. Potential applications include: skin spectrometric sensing to detect signatures of particular materials; stand-off detection of residues of materials (for example, on vehicles) or vapour (for example, under clothing); forensic scene mapping; scanning of luggage/clothes for adhered particles; and micro-spectroscopy of samples (for example, fingerprints).

The OPO system can also be used in free-space ranging and LIDAR applications. The high energies produced by the system, and the ability to tune the output to atmospheric transmission bands (for example, 1.5, 3.8 and 4.2 µm) would allow the system to be used in free-space ranging and active imaging. For example, the time resolution of the pulses could be used to allow highly accurate free-space ranging to few micron resolutions, with applications in terrain mapping and target detection/identification for defense applications.

In addition to the applications mentioned above, the OPO system could also replace a large number of installed but unreliable Ti:sapphire pumped amplifiers in a number of areas.

The OPO system is not limited to operation using pump light at infrared wavelengths or to production of signals at infra-red wavelengths, and any suitable wavelengths can be used for the pump or signal. Furthermore, the OPO system can include a cavity, and have an intra-cavity signal path length, of any suitable size and is not limited to the cavity and signal path sizes described above.

It will be understood that the present invention has been described above purely by way of example, and modifications can be made within the scope of the invention.

Each feature disclosed in the description, and (where appropriate) the claims and drawings may be provided independently or in any appropriate combination.

What is claimed is:

1. An optical parametric oscillator (OPO) comprising:—
   a resonant cavity for signal light; and
   an optically non-linear medium disposed in the resonant cavity for converting pump light into the signal light, wherein
   the resonant cavity is arranged so that in operation signal light is repeatedly output from and returned to the optically non-linear medium along a signal light path in a continuously repeating cycle; and
   the OPO comprises signal light delay means within the signal light resonant cavity for extending the time taken for signal light output from the optically non-linear medium in operation to return to the optically non-linear medium along the signal light path.

2. An OPO according to claim 1, wherein the delay means comprises at least one of:
   means for extending the signal light path;
   a relay imaging system disposed in the resonant cavity;
   a multi-pass mirror system disposed in the resonant cavity; and
   a Herriott cell disposed in the resonant cavity.

3. An OPO according to claim 1, further comprising focusing means for focusing signal light from the delay means at the optically non-linear medium.

4. An OPO according to claim 3, wherein in operation the signal light comprises a signal beam, the pump light comprises a pump beam, and the focusing means and delay means are arranged to co-operate in operation so that the width of the signal beam at the optically non-linear medium is less than or equal to a predetermined threshold, for example so that the width of the signal beam is substantially equal to the width of the pump beam.

5. An OPO according to claim 3, wherein in operation an intracavity mode is formed in the optically non-linear medium and the focusing means and delay means are arranged to co-operate to re-image the intracavity mode in the optically non-linear medium.

6. An OPO according to claim 5, wherein the focusing means and delay means are arranged so that the size of the reimaged intracavity mode in the optically non-linear medium is substantially independent of a variation in the signal light path length.

7. An OPO according to claim 1, wherein the signal light path length is at least one of between 3 m and 300 m; between 6 m and 60 m; and between 15 m and 30 m.

8. An OPO according to claim 1, operable as a synchronous OPO, wherein the signal light comprises at least one signal pulse and the intra-cavity delay means is arranged so that in operation each signal pulse returned to the optically non-linear medium substantially overlaps with a pump pulse in the optically non-linear medium.

9. An OPO according to claim 1, wherein the delay means is arranged so that in operation a signal pulse is returned to the optically non-linear medium at a repetition frequency of at least one of between 1 MHz and 100 MHz; between 5 MHz and 50 MHz; and between 10 MHz and 20 MHz.

10. An OPO according to claim 1, wherein in operation the signal light has a signal light wavelength in the range 450 nano-meters to 10,000 nano-meters.

11. An OPO according to claim 10, wherein in operation each signal pulse has an energy in at least one of a range from 10 nJ to 200 nJ, a range from 10 nJ to 100 nJ and a range from 30 nJ to 75 nJ.

12. An OPO according to claim 1, further comprising a controller for controlling a pump light source to provide the pump light to the OPO.

13. An OPO according to claim 12, wherein in operation the pump light comprises a series of pump pulses at a pulse repetition frequency, and the pump pulse repetition frequency is at least one of between 1 MHz and 100 MHz; between 5 MHz and 50 MHz; and between 10 MHz and 20 MHz.

14. An OPO according to claim 12, wherein in operation the pump light has a pump wavelength in the range 400 nano-meters to 2,000 nano-meters.

15. An OPO according to claim 12, wherein in operation the pump light has an average power in the range 1 W to 10 W.

16. An OPO according to claim 8, wherein each pump pulse has a duration in a range from 0.5 pico-seconds to 5 pico-seconds, and/or has a duration of less than 1 pico-second.

17. An OPO according to claim 8, wherein in operation each signal pulse has a duration in a range from 0.5 pico-seconds to 5 pico-seconds, and/or has a duration of less than 1 pico-second.

18. An OPO according to claim 1, wherein the cavity is a free-space cavity.

19. An OPO according to claim 1, wherein the signal light path comprises free space over at least one of at least 50% of the signal light path length; at least 75% of the signal light path length; and at least 90% of the signal light path length.

20. An OPO according to claim 1, further comprising tuning means for tuning the wavelength by modifying the signal path length of the resonant cavity.

21. An OPO according to claim 1, wherein the system further comprises cavity dumping means.

22. An OPO according to claim 1, further comprising a pump source and the pump source comprises at least one of a fibre laser, a free-space oscillator and a thin disc laser.

23. An OPO according to claim 1, wherein the optically non-linear medium comprises at least one of MgO:PPLN, PPLN, PPRTA, PPKTA, KTP, KTA, RTA, LBO, PPKNB, KNB, CdSe, AgGaSe2, AgGaS2, BIBO, and GaAs.

24. An OPO according to claim 1, wherein the OPO is configured to operate as a light source for at least one a laser waveguide inscription system, a non-linear spectrometer, a multi-photon imaging system a stand-off spectroscopy system, a free-space ranging system and a LIDAR system.

25. An optical parametric oscillator (OPO) comprising:—
a resonant cavity for signal light; and
an optically non-linear medium disposed in the resonant cavity for converting pump light into the signal light, wherein
the resonant cavity is arranged so that in operation signal light is repeatedly output from and returned to the optically non-linear medium along a signal light path in a continuously repeating cycle; and
the OPO comprises a signal light delay device within the signal light resonant cavity for extending the time taken for signal light output from the optically non-linear medium in operation to return to the optically non-linear medium along the signal light path.

* * * * *